(12) United States Patent
Zhu et al.

(10) Patent No.: US 11,698,524 B1
(45) Date of Patent: Jul. 11, 2023

(54) PROJECTION DEVICE BASED ON LED LIGHT SOURCE

(71) Applicant: SHENZHEN KEJINMING ELECTRONIC CO., LTD, Guangdong (CN)

(72) Inventors: Xianxiong Zhu, Guangdong (CN); Chunrong Fan, Guangdong (CN); Yiwei Zheng, Guangdong (CN)

(73) Assignee: SHENZHEN KEJINMING ELECTRONIC CO., LTD, Shenzhen (CN)

( * ) Notice: Subject to any disclaimer, the term of this patent is extended or adjusted under 35 U.S.C. 154(b) by 0 days.

(21) Appl. No.: 18/154,904

(22) Filed: Jan. 16, 2023

(30) Foreign Application Priority Data

Jan. 26, 2022 (CN) .......................... 202210096569.7

(51) Int. Cl.
*G02B 26/00* (2006.01)
*G03B 21/20* (2006.01)
(Continued)

(52) U.S. Cl.
CPC ......... *G02B 26/008* (2013.01); *G03B 21/006* (2013.01); *G03B 21/204* (2013.01);
(Continued)

(58) Field of Classification Search
CPC .. G02B 26/008; G02B 27/141; G03B 21/006; G03B 21/204; G03B 21/2066; G03B 21/2073; G03B 21/208; G03B 21/28
See application file for complete search history.

(56) References Cited

U.S. PATENT DOCUMENTS

2005/0134808 A1* 6/2005 Pettitt .................. G02B 26/008
353/84
2006/0250580 A1* 11/2006 Silverstein ............. H04N 9/315
348/E9.027
(Continued)

FOREIGN PATENT DOCUMENTS

CN 109164667 A 1/2019
CN 211509206 U 9/2020
(Continued)

OTHER PUBLICATIONS

Notice of Allowance of counterpart Chinese Patent Application No. 202210096569.7 dated Jul. 8, 2022.
(Continued)

*Primary Examiner* — Magda Cruz

(57) ABSTRACT

The application relates to the technical field of projection, and discloses a projection device which can improve the brightness of projection imaging. Part of the projection device comprises: an LED light source, a color wheel, a light-equalizing rod, a convex lens, a first Fresnel lens, an LCD panel and a projection lens; a ray of target light emitted by the LED light source emits a target alternating light through the color wheel, and the target alternating light comprises five monochromatic lights including red light, green light, blue light, yellow light and white light, and the five monochromatic lights enter the light-equalizing rod for uniform treatment to emit an uniform light spot, the uniform light spot is imaged at the first Fresnel lens through the convex lens, then irradiated into the LCD panel, and projected by the projection lens.

8 Claims, 1 Drawing Sheet

(51) Int. Cl.
  *G03B 21/28* (2006.01)
  *G03B 21/00* (2006.01)
  *G02B 27/14* (2006.01)

(52) U.S. Cl.
  CPC ....... *G03B 21/208* (2013.01); *G03B 21/2066* (2013.01); *G03B 21/2073* (2013.01); *G03B 21/28* (2013.01); *G02B 27/141* (2013.01)

(56) References Cited

U.S. PATENT DOCUMENTS

2008/0143968 A1* 6/2008 Lin .................. G03B 33/08
  353/84
2021/0124242 A1* 4/2021 Guo .................. G03B 21/2033

FOREIGN PATENT DOCUMENTS

| CN | 113568263 A | | 10/2021 | |
|---|---|---|---|---|
| JP | 2008096707 A | * | 4/2008 | ............. G03B 21/10 |
| TW | 200825612 A | | 6/2008 | |

OTHER PUBLICATIONS

2nd Office Action of counterpart Chinese Patent Application No. 202210096569.7 dated Jun. 30, 2022.

* cited by examiner

PROJECTION DEVICE BASED ON LED LIGHT SOURCE

CROSS REFERENCE TO RELATED APPLICATIONS

The present application claims the benefit of Chinese Patent Application No. 202210096569.7 filed on Jan. 26, 2022, the contents of which are incorporated herein by reference in their entirety.

TECHNICAL FIELD

The application belongs to the technical field of projection, and particularly relates to a projection device based on LED light source.

BACKGROUND

Projection technology is an effective way to realize large-screen display at present. Projection display refers to the way of projecting the image generated by display onto screen through optical system to generate image. At present, the mainstream projector types include 3LCD projector and single-chip LCD projector.

For the traditional single-chip LCD projector, the modulated three primary colors are projected on the big screen through projection lens by using the color image of the light source passing through the LCD panel. However, in the existing single-chip LCD projector, due to the limitations of the transmittance of LCD panel and three primary color sources, the traditional method would lead to low transmittance of LCD panel, resulting in insufficient color gamut of the final projection image.

SUMMARY

The present application relates to the technical field of projection, and discloses a projection device based on LED light source, which is used to solve the technical problem of insufficient color gamut of projection image in the traditional projection solution.

The technical solutions adopted by the present application to solve the above technical problem are as follows:

A projection device, including an LED light source, a color wheel, a light-equalizing rod, a convex lens, a first Fresnel lens, a first polarizing plate, an LCD panel and a projection lens, the first polarizing plate is positioned between the first Fresnel lens and the LCD panel; a ray of target light emitted by the LED light source emits a target alternating light through the color wheel, and the target alternating light includes five monochromatic lights, the monochromatic lights include red light, green light, blue light, yellow light and white light, and the five monochromatic lights enter the light-equalizing rod for uniform treatment to emit an uniform light spot, the uniform light spot is imaged at the first Fresnel lens through the convex lens, then irradiated into the LCD panel, and projected by the projection lens; the projection device further includes a grating arranged between the first polarizing plate and the LCD panel, the grating is configured to properly refract an incident light from the first polarizing plate and enter an corresponding area of the LCD panel at a desired angle.

In an embodiment, the projection device further includes a second Fresnel lens and a second polarizing plate; the first polarizing plate is positioned between the first Fresnel lens and the LCD panel, the second polarizing plate and the second Fresnel lens are sequentially arranged and positioned between the LCD panel and the projection lens, the second polarizing plate is attached to one side of the LCD panel, the first polarizing plate is attached to one side of the LCD panel, one side of the first Fresnel lens is a flat transparent surface, and another side of the first Fresnel lens is a threaded transparent surface, the flat transparent surface of the first Fresnel lens faces the convex lens, and the threaded transparent surface of the first Fresnel lens faces the first polarizing plate; one side of the second Fresnel lens is a flat transparent surface, and another side of the second Fresnel lens is a threaded transparent surface, the flat transparent surface of the second Fresnel lens faces the second polarizing plate, and the threaded transparent surface of the second Fresnel lens faces the projection lens; and the uniform light spot is imaged at the first Fresnel lens through the convex lens, and then passes through the first polarizing plate, the LCD panel, the second polarizing plate and the second Fresnel lens in turn to form a projection beam.

In an embodiment, the projection device further includes a condenser lens and a spherical mirror, wherein the LED light source is located between the condenser lens and the spherical mirror, the condenser lens is positioned between the LED light source and the color wheel, and the axes of the spherical mirror, the condenser lens and the LED light source are located on the same straight line.

In an embodiment, the axes of the LED light source, the color wheel, the light-equalizing rod, the convex lens, the first Fresnel lens, the LCD panel and the projection lens are located on the same straight line.

In an embodiment, the projection device further includes a first dichroic mirror, the first dichroic mirror is positioned between the first Fresnel lens and the convex lens, and the first dichroic mirror is used for separating a converging light emitted by the convex lens into a plurality of light beams, and the light beams are injected into the first Fresnel lens at different angles.

In an embodiment, the projection device further includes a grating, which may be arranged between the first polarizing plate 6 and the LCD panel 7, and is configured to properly refract the incident light from the first polarizing plate 6 and enter the corresponding area of the LCD panel at a required angle (for example, the green light is accurately refracted into the green pixel). In this way, different refraction can be generated for each five-color alternating light with different wavelengths, and then it can be guided to the LCD panel, which reduces the blocking of light caused by the material characteristics of the LCD panel and improves the transmittance.

In an embodiment, the uniform light spot is imaged to the first Fresnel lens 5 by using the Abbe imaging principle, and then irradiated into the LCD panel 7. It should be noted that in the traditional solution, the light combining unit such as prism unit is usually used to combine the three primary colors separated by LED light source 1, but it is undoubtedly necessary to add an additional light combining unit (such as prism unit) to the projection device, which increases the system cost of the projection device. However, in this application, the Abbe principle is adopted to image at the first Fresnel lens 5 through the convex lens 4, and then it is irradiated into the LCD panel 7 for imaging. It is an innovative design, which eliminates the use of prism unit or other light combining unit, and greatly reduces the overall cost of the projection device.

In some embodiments, the second Fresnel lens may be replaced by a second dichroic mirror, a third dichroic mirror, a fourth dichroic mirror and a fifth dichroic mirror. Among them, the second dichroic mirror is used to reflect and guide the red light in the three modulated image beams of LCD panel 7 to the second dichroic mirror, the third dichroic mirror is used to transmit the green light in the image beam and reflect the red light guided by the second dichroic mirror, the green light transmitted through the third dichroic mirror and red light of the third dichroic mirror are guided to the fourth dichroic mirror, and transmitted through the fourth dichroic mirror. The blue light in the image enters the fifth dichroic mirror, and then is reflected and guided to the fourth dichroic mirror, and is combined and output with the red light and green light transmitted by the fourth dichroic mirror, thereby the red light, green light and blue light of the image information are adjusted to a position parallel to the optical axis, and are output to the projection lens 10 for projection imaging. The optical axis is the position of the dotted arrow in FIG. 1. In this embodiment, the high-cost design of a light combining system such as a prism unit is also avoided, and only a few dichroic mirrors are needed to realize it, which provides another idea. In some embodiments, the angle between the second dichroic mirror, the third dichroic mirror and the optical axis is 45 degrees, and the angle between the fourth dichroic mirror, the fifth dichroic mirror and the optical axis is −45 degrees.

In one of the solutions provided by the present application, the radiant light of LED light source is converted into five kinds of alternating monochromatic light by color wheel, and yellow light and white light can be used for light compensation or color temperature adjustment, which can effectively adjust the projection color gamut.

1-LED light source; 2-Color wheel; 3-Light-equalizing rod; 4-Convex lens; 5-First Fresnel lens; 6-First polarizing plate; 7-LCD panel; 8-Second polarizing plate; 9-Second Fresnel lens; 10-Projection lens; 11-Grating; 12-Condenser lens; 13-Spherical mirror; 14-First dichroic mirror.

DETAILED DESCRIPTION OF DISCLOSED EMBODIMENTS

In order to make the technical problems to be solved, technical solutions and beneficial effects of the present application more clear, the present application will be further described in detail below with embodiments and drawings. It should be understood that the specific embodiments described herein are for the purpose of illustrating the application only, and not intended to limit the application.

Figure 1:
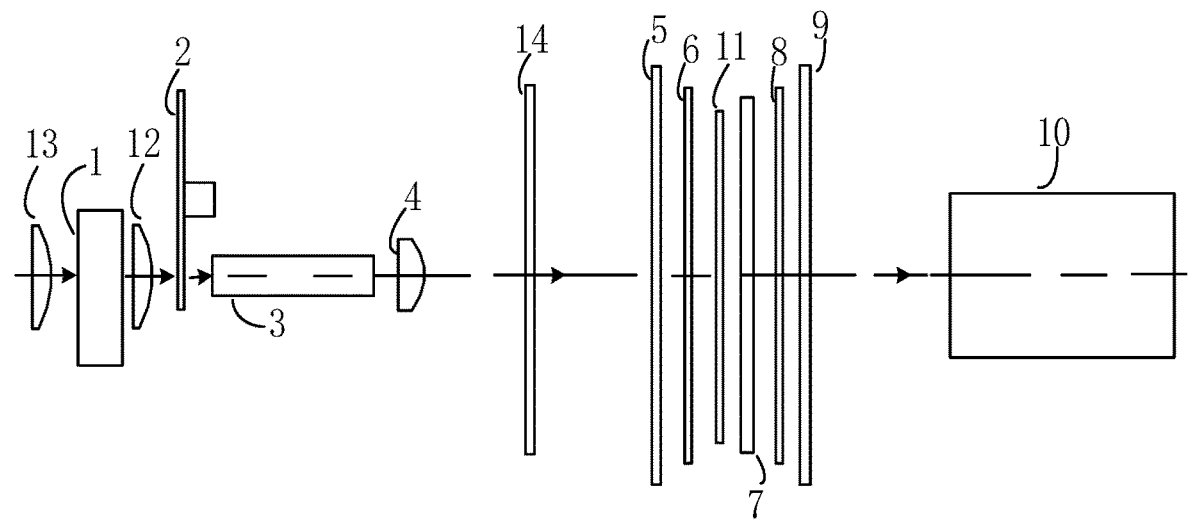
FIG. 1 is a structural schematic diagram of a projection device provided by an embodiment of the present application.
Figure 2:
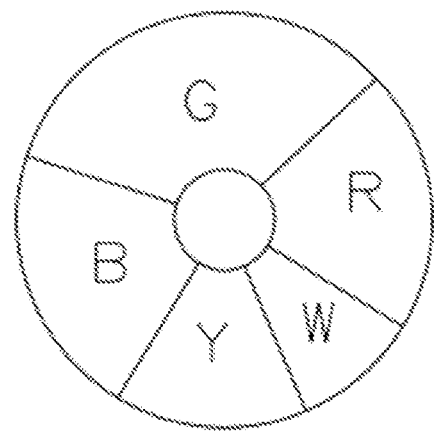
FIG. 2 is a structural schematic diagram of a color wheel provided by the present application.

In an embodiment, as shown in FIG. 1, a projection device is provided, which includes an LED light source 1, a color wheel 2, a light-equalizing rod 3, a convex lens 4, a first Fresnel lens 5, an LCD panel 7 and a projection lens 10. The LED light source 1, color wheel 2, light-equalizing rod 3, convex lens 4, first Fresnel lens 5, LCD panel 7 and projection lens 10 are arranged in sequence. As shown in FIG. 2, which is a structural schematic diagram of a color wheel, a ray of target light emitted by the LED light source 1 passes through the color wheel 2 to emit a target alternating light, which includes five monochromatic lights, including red light (R), green light (G), blue light (B), yellow light (Y) and white light (W). In an embodiment, the projection device further includes a condenser lens 12 and a spherical mirror 13, the LED light source 1 is located between the condenser lens 12 and the spherical mirror 13, the condenser lens 12 is positioned between the LED light source 1 and the color wheel 2, and the spherical mirror 13, condenser lens 12 and LED light source 1 are located on the same straight line. That is, the spherical mirror 13 is opposite to the LED light source 1, the LED light source 1 is used to generate radiation light, and some of it is reflected by the spherical mirror 13, which can increase the brightness of the LED light source 1. The condenser lens 12 is used to condense the radiation emitted by the LED light source 1 and the reflected light of the spherical mirror 13 to obtain condensed light. It is also condensed into parallel light by the condenser lens 12, i.e., the above-mentioned target beam can reduce the light scattering emitted by the LED light source 1 and further improve the light utilization rate. The converged parallel light would be converted into alternating light of five colors: red, green, blue, yellow and white through the color wheel 2, i.e., the color wheel is configured to convert the target light emitted by the LED light source 1 into five monochromatic lights.

In an embodiment, the axes of the LED light source 1, color wheel 2, light-equalizing rod 3, convex lens 4, first Fresnel lens 5, LCD panel 7 and projection lens 10 are on the same straight line. That is, the axis of the LED light source 1, the axis of the color wheel 2, the axis of the light-equalizing rod 3, the axes of the several lenses, the axis of the LCD panel 7 and the axis of the projection lens 10 are located on the same straight line, so as to form a desired incident angle of light, reduce the scattering of light and form a better projection effect.

The alternating light of various colors emitted by the color wheel 2 enters the light-equalizing rod 3 for uniform treatment to emit uniform light spots. It can be understood that there may be light rays with divergent angles when alternating light enters the entrance of the light-equalizing rod 3. The polarized light corresponding to the five monochromatic lights is collected by the light-equalizing rod 3 and uniformly processed, so that the polarized light incident on the light-equalizing rod 3 is reflected and uniformly spread for many times, thereby the light beams are uniformly distributed, and a uniform light spot with good divergence is obtained, so that a better light equalizing effect can be obtained, and uniform imaging can be achieved later. And, in one embodiment, the exit of the light-equalizing rod 3 is attached to the plane of the convex lens 4, and the convex surface of the convex lens 4 faces the first Fresnel lens 5, so as to avoid occupying too much space because of the light-equalizing rod 3. The uniform light spot emitted from the light-equalizing rod 3 is imaged at the first Fresnel lens 5 through the convex lens 4 and then irradiated into the LCD panel 7, that is, the light-emitting surface of the convex lens 4 faces the light-entering surface of the first Fresnel lens 5, and after passing through the first Fresnel lens 5, a bright and colorful light beam is formed and irradiated on the LCD panel 7. Finally, it is projected by the projection lens 10, for example, the display screen of the LCD panel 7 is projected on a projection screen or a projection panel (wall, etc.).

In an embodiment, the projection device further includes a second Fresnel lens 9, a first polarizing plate 6 and a second polarizing plate 8. The first polarizing plate 6, as an incident polarizing plate, is positioned between the first Fresnel lens 5 and the LCD panel 7, the second polarizing plate 8 and the second Fresnel lens 9 are sequentially arranged and positioned between the LCD panel 7 and the projection lens 10, wherein the second polarizing plate 8 is attached to one side of the LCD panel 7. One side of the first Fresnel lens 5 is a flat transparent surface, and the other side of the first Fresnel lens 5 is a threaded transparent surface, the flat transparent surface of the first Fresnel lens 5 faces the convex lens, and the threaded transparent surface of the first Fresnel lens 5 faces the first polarizing plate 6. One side of the second Fresnel lens 9 is a flat transparent surface, and the other side of the second Fresnel lens 9 is a threaded transparent surface, the flat transparent surface of the second Fresnel lens 9 faces the second polarizing plate 8, and the threaded transparent surface of the second Fresnel lens 9 faces the projection lens 10. The first polarizing plate 6 is attached to one side of the LCD panel 7. The uniform light spot is imaged at the first Fresnel lens 5 through the convex lens 4, then passes through the first polarizing plate 6, LCD panel 7, second polarizing plate 8 and second Fresnel lens 9 in sequence to form a projection beam, and finally is projected by the projection lens 10. In this embodiment, the first polarizing plate 6 is used as an incident polarizing plate, and the second polarizing plate 8 is used as an outgoing polarizing plate. The first polarizing plate 6 and second polarizing plate 8 are arranged in front and back of the LCD panel, and, finally, the second Fresnel lens 9 is used to uniformly scatter the projection light on the projection lens 10, so that the projection picture can be projected evenly.

In an embodiment, the projection device further includes a first dichroic mirror 14, wherein the first dichroic mirror 14 is positioned between the first Fresnel lens 5 and the convex lens 4, and the first dichroic mirror 14 is used for separating the converging light emitted by the convex lens 4 into a plurality of light beams, and the light beams enter the first Fresnel lens 5 at different angles. In this way, according to the wavelength range required for color image display, the light emitted by the convex lens 4 can be separated into the required light beam and injected into the first Fresnel lens 5, so as to improve the subsequent imaging display quality.

In an embodiment, the projection device further includes a control unit (not shown in the figure), which is used for the color wheel 2 to alternately output the five monochromatic lights in a certain interval sequence in a period. In an embodiment, the control unit is configured to receive a display control signal, the display control signal includes a color signal and a synchronization signal. And the color wheel 2 is controlled to generate the five monochromatic lights according to the synchronization signal in a certain alternating order, and the LCD panel 7 is controlled to correspondingly adjust the light beam injected into the LCD panel 7 according to the color signal.

It should be noted that, in the traditional projection device based on three primary colors, a processing unit is generally required to shift the red, green and blue signals after receiving them, and then color data are generated by combining with the synchronization signal for display, so as to display R, G and B data on the LCD panel. The three primary color beams emitted by the light source are alternately transmitted in a certain order, and the transmitted three primary color monochromatic lights are transmitted or reflected by the LCD panel according to the R, G and B data, so as to be projected on the screen. However, the inventor found that, in order to make the single LCD panel show better colors in projection, the three primary colors are generally shared in a certain cycle time, which would lead to less output time for each monochromatic light and lower brightness. In this embodiment, besides compensating yellow light and white light to increase brightness and color gamut, some improvements have been made in light modulation. In this application, the projection device includes a control unit. After receiving the five monochromatic light signals, i.e., R signal, G signal, B signal, Y signal and W signal, the control unit adjusts the compensation, contrast and brightness of the five monochromatic light signals to obtain R1, G1, B1, Y1 and W1 signals corresponding to the LCD panel 7, and then injects them into the LCD panel 7. It can be seen that, compared with the traditional three primary colors, the total amount of light generated by the five light beams is higher than the sum of the three primary colors, and the white light increases the brightness but may affect the color gamut. Therefore, the application adjusts the W signal by the control unit to obtain the W2 signal, the W2 signal is used to compensate for the lack of color gamut, and the synchronization signal is also received. The synchronization signal includes a vertical synchronization signal and a horizontal synchronization signal. The synchronization signal is used to control the alternate output timing of the five monochromatic lights according to the image. The color wheel 2 receives the light source from LED light source 1 and receives the above-mentioned synchronization signal from the control unit. According to the synchronization signal, it alternately outputs five monochromatic lights in a cycle according to the required sequence. The output five monochromatic lights enter the LCD panel 7 after passing through the convex lens 4, first Fresnel lens 5 and first polarizing plate 6, that is, the LCD panel 7 is installed on the path of monochromatic lights, and the R1, G1, B1, Y1 and W1 signals are further modulated by the control unit to enter the LCD panel 7, and the final projection beam is amplified by the projection lens 10.

In an embodiment, the projection device further includes a grating 11, which may be arranged between the first polarizing plate 6 and the LCD panel 7. The grating 11 is configured to properly refract the incident light from the first polarizing plate 6 and enter the corresponding area of the LCD panel at a required angle (for example, the green light is accurately refracted into the green pixel). In this way, different refraction can be generated for each five color alternating light with different wavelengths, so that it can be guided to the LCD panel, which reduces the blocking of light caused by the material characteristics of the LCD panel 7 and improves the transmittance.

In an embodiment, the uniform light spot is imaged to the first Fresnel lens 5 by using the Abbe imaging principle, and then irradiated into the LCD panel 7. It should be noted that in the traditional solution, the light combining unit such as prism unit is usually used to combine the three primary colors separated by LED light source 1. However, it is undoubtedly necessary to add an additional light combining unit (such as prism unit) to the projection device, which increases the system cost of the projection device. However, in the present application, the Abbe imaging principle is adopted to image at the first Fresnel lens 5 through the convex lens 4, and then it is irradiated into the LCD panel 7 for imaging It is an innovative design, which eliminates the use of prism unit or other light combining units, greatly reduces the overall cost of the projection device, and has a smaller overall structure.

In some embodiments, the second Fresnel lens may be replaced by a second dichroic mirror, a third dichroic mirror, a fourth dichroic mirror and a fifth dichroic mirror. Among them, the second dichroic mirror is used to reflect and guide the red light in the three modulated image beams of LCD panel 7 to the second dichroic mirror, the third dichroic mirror is used to transmit the green light in the image beam and reflect the red light guided by the second dichroic mirror, the green light transmitted through the third dichroic mirror and the red light transmitted through the third dichroic mirror are guided to and transmitted through the fourth dichroic mirror. The blue light in the image enters the fifth dichroic mirror, then is reflected and guided to the fourth dichroic mirror, and is output and combined with the red light and green lights transmitted by the fourth dichroic mirror, so as to adjust the red, green and blue lights of the image information to a position parallel to the optical axis, and output to the projection lens 10 for projection imaging. And, the optical axis is the position of the dotted arrow in FIG. 1. In this embodiment, the high-cost design of a light combining system such as a prism unit is also avoided, and only a few dichroic mirrors are needed to realize it, which provides another idea. In some embodiments, the angle between the second dichroic mirror, the third dichroic mirror and the optical axis is 45 degrees, and the angle between the fourth dichroic mirror, the fifth dichroic mirror and the optical axis is −45 degrees. With the above angle design, the final output light can be located on the main axis, providing a final imaging quality. It should be noted that, in some embodiments, since the optical path corresponding to the green light image is not reflected, and its total path is shorter than that of red light and blue light, it is possible to continue to use several dichroic mirrors to increase the optical path of the green light to make it the same as that of red light and blue light, thus ensuring the imaging quality.

It should be noted that the projection device may also include modules such as a power supply, a switch or a control circuit, which are not described in detail herein.

The above descriptions are only preferred embodiments of the present application, not intended to limit the present application. Any modification, equivalent replacement and improvement within the spirit and principle of the present application shall be included in the protection scope of the present application.

What is claimed is:

1. A projection device based on LED light source, wherein the projection device comprises an LED light source, a color wheel, a light-equalizing rod, a convex lens, a first Fresnel lens, a first polarizing plate, an LCD panel and a projection lens, the first polarizing plate is positioned between the first Fresnel lens and the LCD panel; a ray of target light emitted by the LED light source emits a target alternating light through the color wheel, and the target alternating light comprises five monochromatic lights, the monochromatic lights comprise red light, green light, blue light, yellow light and white light, and the five monochromatic lights enter the light-equalizing rod for uniform treatment to emit an uniform light spot, the uniform light spot is imaged at the first Fresnel lens through the convex lens, then irradiated into the LCD panel, and projected by the projection lens; the projection device further comprises a grating arranged between the first polarizing plate and the LCD panel, the grating is configured to properly refract an incident light from the first polarizing plate and enter an corresponding area of the LCD panel at a desired angle.

2. The projection device of claim 1, wherein the projection device further comprises a second Fresnel lens and a second polarizing plate; the second polarizing plate and the second Fresnel lens are sequentially arranged and positioned between the LCD panel and the projection lens, the second polarizing plate is attached to one side of the LCD panel, the first polarizing plate is attached to one side of the LCD panel, one side of the first Fresnel lens is a flat transparent surface, and another side of the first Fresnel lens is a threaded transparent surface, the flat transparent surface of the first Fresnel lens faces the convex lens, and the threaded transparent surface of the first Fresnel lens faces the first polarizing plate; one side of the second Fresnel lens is a flat transparent surface, and another side of the second Fresnel lens is a threaded transparent surface, the flat transparent surface of the second Fresnel lens faces the second polarizing plate, and the threaded transparent surface of the second Fresnel lens faces the projection lens; and the uniform light spot is imaged at the first Fresnel lens through the convex lens, and then passes through the first polarizing plate, the LCD panel, the second polarizing plate and the second Fresnel lens in turn to form a projection beam.

3. The projection device of claim 2, wherein the projection device further comprises a first dichroic mirror, the first dichroic mirror is positioned between the first Fresnel lens and the convex lens, and the first dichroic mirror is used for separating a converging light emitted by the convex lens into a plurality of light beams, and the light beams are injected into the first Fresnel lens at different angles.

4. The projection device of claim 1, further comprising a condenser lens and a spherical mirror, wherein the LED light source is located between the condenser lens and the spherical mirror, the condenser lens is positioned between the LED light source and the color wheel, and the axes of the spherical mirror, the condenser lens and the LED light source are located on the same straight line.

5. The projection device of claim 4, wherein the projection device further comprises a first dichroic mirror, the first dichroic mirror is positioned between the first Fresnel lens and the convex lens, and the first dichroic mirror is used for separating a converging light emitted by the convex lens into a plurality of light beams, and the light beams are injected into the first Fresnel lens at different angles.

6. The projection device of claim 1, wherein the axes of the LED light source, the color wheel, the light-equalizing rod, the convex lens, the first Fresnel lens, the LCD panel and the projection lens are located on the same straight line.

7. The projection device of claim 6, wherein the projection device further comprises a first dichroic mirror, the first dichroic mirror is positioned between the first Fresnel lens and the convex lens, and the first dichroic mirror is used for separating a converging light emitted by the convex lens into a plurality of light beams, and the light beams are injected into the first Fresnel lens at different angles.

8. The projection device of claim 1, wherein the projection device further comprises a first dichroic mirror, the first dichroic mirror is positioned between the first Fresnel lens and the convex lens, and the first dichroic mirror is used for separating a converging light emitted by the convex lens into a plurality of light beams, and the light beams are injected into the first Fresnel lens at different angles.

* * * * *